United States Patent Office 3,575,923
Patented Apr. 20, 1971

3,575,923
AQUEOUS PROCESS FOR THE PREPARATION OF POLYIMIDE RESINS
Robert T. Jones, Pelham, Mass., assignor to Monsanto Company, St. Louis, Mo.
No Drawing. Filed Oct. 11, 1968, Ser. No. 767,001
Int. Cl. C08g 20/32
U.S. Cl. 260—47                     13 Claims

ABSTRACT OF THE DISCLOSURE

Disclosed herein is an aqueous process for the preparation of polyimide resins which process comprises reacting in an aqueous medium:

(1) benzophenone tetracarboxylic dianhydride or benzophenone tetracarboxylic acid and
(2) a water soluble polyamine having at least two primary amino groups per molecule at temperatures of at least 60° C. for a time sufficient to form recurring imide units in the polymer.

BACKGROUND OF THE INVENTION (1) Field of the invention

The present invention relates to a novel process for the preparation of polyimide resins. More particularly, this invention relates to an aqueous process for preparing polyimide resins which process comprises reacting in an aqueous medium:

(1) benzophenone tetracarboxylic dianhydride or benzophenone tetracarboxylic acid and
(2) a water soluble polyamine having at least two primary amino groups per molecule at temperatures of at least 60° C. for a time sufficient to form recurring imide units in the polymer.

(2) Description of the prior art

Polyimide resins and molding powders are well-known in the prior art. These materials and processes for their preparation are described in such patents as 3,179,631, 3,179,633, 3,179,634 and 3,249,588. The processes of the prior art call for reacting a tetracarboxylic component and a diamine under anhydrous conditions in a solvent for at least one of the reactants, the solvent being inert to the reactants. Examples of the solvents used in the prior art are N,N-dimethyl formamide, N,N-dimethyl acetamide, N-methyl-2-pyrrolidone, pyrridine, dimethyl sulfone, formamide, N-methyl formamide, etc. These solvents are both expensive and hazardous in that they are flammable and toxic. Furthermore, in order to recover the solid resin it was necessary to resort to involved precipitation or evaporation techniques which in turn gave rise to involved solvent recovery problems.

A definite need exists for a process for the preparation of polyimide resins wherein the process is carried out in a safe, inexpensive medium. Moreover, a need exists for a polyimide resin process wherein the solid polymer is recovered easily and efficiently without resorting to elaborate precipitation or evaporation techniques. The present invention provides a solution to this problem by setting forth a process for the preparation of polyimide resins wherein the process is carried out in an aqueous medium rather than in the hazardous and expensive solvent mediums used in the prior art.

SUMMARY OF THE INVENTION

The present invention relates to an aqueous process for the preparation of polyimide molding powders which process comprises reacting in an aqueous medium:

(1) benzophenone tetracarboxylic dianhydride or benzophenone tetracarboxylic acid and
(2) a water soluble polyamine having at least two primary amino groups per molecule at temperatures of at least 60° C. for a time sufficient to form recurring imide units in the polymer.

It was generally believed in the polyimide art that the reaction between a tetracarboxylic component and a diamine to form polyamide acids or polyimides had to be carried out in a relatively inert organic solvent for at least one of the reactants, preferably under anhydrous conditions. The preferred solvents presented a health hazard in that they were flammable and toxic and prolonged exposure to these solvents had to be avoided. The present invention provides a solution to these problems by setting forth a process wherein the polymer forming reaction is carried out in an aqueous medium without the need for the organic solvents of the prior art. The reaction product is recovered as a granular precipitate which avoids the solvent/non-solvent precipitation or evaporation techniques of the prior art.

Moreover, an additional unexpected advantage is realized in that polyimide resins prepared by the aqueous process of the present invention exhibit improvements in certain physical properties. These unexpected developments are made possible by a judicious selection of reactants and controlled reaction times and temperatures.

The resulting polyimide products find widespread use and application wherever high temperature resistant resins are required. These materials are easily molded into shaped objects which are useful per se or which can be machined into other useful objects. Examples of these molded objects would include bearings, grinding wheels, washers, piston rings, and other such molded parts whose high thermal stability and resistance to chemical corrosion has led to wide acceptance in the automotive and aerospace industries, as well as in other industrial applications.

It is, therefore, an object of this invention to provide an aqueous process for the preparation of polyimide resins.

It is another object of this invention to provide an aqueous process for the preparation of polyimide molding powder.

It is a further object of this invention to provide improved polyimide materials made by an aqueous process.

DESCRIPTION OF THE PREFERRED EMBODIMENTS

The foregoing and other objects are accomplished by reacting in an aqueous medium:

(1) benzophenone tetracarboxylic dianhydride or benzophenone tetracarboxylic acid and
(2) a water soluble polyamine having at least two primary amino groups per molecule in an aqueous medium at temperatures of at least 60° C. for a time sufficient to form recurring imide units in the polymer.

The polyamine components used in the present invention are those which have a solubility of at least 0.01 part per hundred parts of water at 60° C.

The preferred polyamine components are diamines characterized by the formula $H_2N-R-NH_2$ wherein R is a divalent radical containing at least two carbon atoms selected from the following groups: aromatic, aliphatic, cycloaliphatic, combination of aromatic and aliphatic, heterocyclic and bridged aromatic radicals wherein the bridging group is a divalent radical selected from the group consisting of alkylene of form 1 to 6 carbon atoms, oxygen, arylene of from 6 to 16 carbon atoms, —NH—, sulfur, sulfonyl, carbonyl, phosphorous, phosphonyl, silicon and derivatives thereof. The preferred R groups in the diamines are the aromatic amines containing at least one ring of 6 carbon atoms, characterized by benzenoid unsaturation. Examples of these preferred R groups would include para-phenylene, meta-phenylene, bisphenyl radicals, fused ring systems having 2 to 4 aromatic nuclei wherein the two amine groups would be located on separate aromatic nuclei and bridged organic radicals of the general formula:

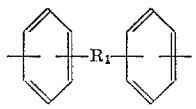

wherein $R_1$ is a divalent radical selected from the group consisting of an alkylene radical of from 1 to 6 carbon atoms, arylene radicals of from 6 to 16 carbon atoms, oxygen, —NH—, carbonyl, sulfonyl, phosphonyl, and silyl radicals wherein the substituent groups on the silyl radical are aryl of from 6 to 16 carbon atoms and those structures wherein the $R_1$ group is a divalent linking moiety joining the aromatic nuclei by ester, amide and thioester linkages.

Among the diamines which are suitable for use in the present invention are: meta-phenylene diamine; para-phenylene diamine; 4,4'-diamino-diphenyl propane; 4,4'-diamino-diphenyl methane; benzidine; 4,4'-diamino-diphenyl sufilde; 4,4'-diamino-diphenyl sulfone; 3,3'-diamino-diphenyl sulfone; 4,4'-diamino-diphenyl ether; 2,6-diamine-pyridine; bis(4-amino-phenyl)diethyl silane; bis-(4-amino-phenyl)diphenyl silane; bis-(4-amino-phenyl)-N-methyl amine; 1,5-diamino naphthalene; 3,3'-dimethyl-4,4'-diamino-diphenyl; 3,3'-dimethoxy benzidine; 2,4-bis-(beta-amino-t-butyl)toluene; bis-(para-beta-amino-t-butyl-phenyl)ether; para-bis-(2-methyl-4-amino-pentyl)benzene; para-bis-(1,1-dimethyl-5-amino-pentyl)benzene; m-xylylene diamine; p-xylylene diamine; bis(para-amino-cyclohexyl)-methane; hexamethylene diamine; heptamethylene diamine; octamethylene diamine; nonamethylene diamine; decamethylene diamine; 3-methyl-heptamethylene diamine; 4,4-dimethyl-heptamethylene diamine; 2,11-diamino-dodecane 1,2-bis-(3-amino-propoxy)ethane; 2,2-dimethyl propylene diamine; 3-methoxy-hexamethylene diamine; 2,5-dimethyl-hexamethylene diamine; 2,5-dimethyl-heptamethylene diamine; 5-methyl nonamethylene diamine; 1,4-diamino-cyclohexane; 1,12-diamino-octadecane; 2,5-diamino-1,3,4-oxadiazole, $H_2N(CH_2)_2-O(CH_2)_3NH_2$; $H_2N(CH_2)_3S(CH_2)_3NH_2$ $H_2N(CH_2)_3N(CH_3)(CH_2)_3NH_2$; 3,3'-dichlorobenzidine; bis-(4-amino-phenyl)ethyl phosphine oxide; bis-(4-amino-phenyl)phenyl phosphine oxide; bis-(4-amino-phenyl)-N-phenylamine; p-phenylene-bis-2-(amino-1,3-benzoxazole); 2,5-bis(p-amino phenyl)-1,3,4-oxadiazole; m-phenylene-bis-(m-aminobenzamide); 3,4'-diamino benzanilide and mixtures of the foregoing.

Examples of such suitable polyamines include melamine; tris-4-(amino-phenyl)methylcarbinol; 3-methyl-4,6,4'-triamino-diphenylmethane; 1,2,4-benzene-triamine; 1,3,5-triaminobenzene; 2,4,4'-bis-phenyltriamine; the various triaminodiphenyl ethers; tetraaminodiphenyl ethers; hexaminodiphenyl ethers; etc., the various triaminodiphenyl sulfides; tetraaminodiphenyl sulfides, pentaaminodiphenyl sulfides, etc., 3,3'-diamino-benzidine; bis(3-methyl-4,6-diaminophenyl)methane; and various tri, tetra, penta and hexaminodiphenyl compounds wherein the two phenyl groups are bridged by a divalent radical.

Other useful polyamino compounds include those which correspond to the following general formulae:

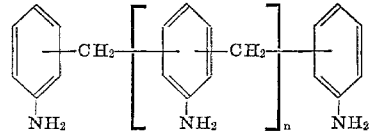

where $n$ is an integer of from 0 to 3; and

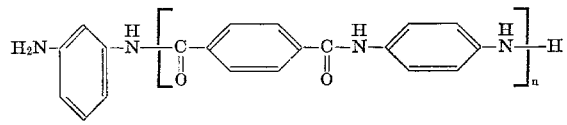

where $n$ is an integer of from 1 to 4.

The proportion of reactants used in the present invention can be varied over a wide range, for example, one can use about 70% molar excess of the polyamine to about a 10% molar excess of the benzophenone tetracarboxylic compound. Preferably one would use up to a 20% molar excess of the polyamine to about a 5% molar excess of the benzophenone tetracarboxylic compound. More preferably, one would use equimolar amounts of the respective components.

The present process is carried out by dispersing the benzophenone tetracarboxylic component and the polyamine in water and heating this mixture to temperatures of at least 60° C. for a time suffiicient to form the recurring imide units in the polymer. In the preferred process the benzophenone tetracarboxylic component is dispersed in water and heated to at least 60° C. and more preferably at at least 80° C. The polyamine component is then introduced into the aqueous solution and heating is maintained for a time sufficient to form recurring imide units in the polymer.

In the more preferred process an aqueous slurry of the benzophenone tetracarboxylic component is heated to reflux and the diamine component is introduced into the vesssel and reflux conditions are maintained for at least 30 minutes. After the reaction is completed the reaction mass is cooled and the polymeric material is isolated, washed with water and dried.

Prior to being used as a molding powder, the granular polymeric product is cured by heating at temperatures greater than 60 °C. and for a time sufficient to eliminate volatiles and to complete the imidization step.

The following examples are set forth in illustration of this invention and are not to be construed as a limitation thereof. Unless otherwise indicated, all parts and percentages are by weight.

EXAMPLE 1

112.5 parts of benzophenone tetracarboxylic dianhydride (BTDA) are added to 500 parts of water of 60° C. in an agitated resin kettle. The slurry is heated to reflux (100° C.) and held there ¼ hour, during which time the BTDA dissolves. The solution is cooled to 90° C. and 37.4 parts of m-phenylene diamine (m-PDA) are added and the resulting solution is heated to reflux and held there 8½ hours. The first precipitate of polymer is observed 10 minutes after reaching reflux. The reaction mixture is cooled to room temperature and the solids are filtered and cured for 4 hours at 300° C. The melting point of the polymeric product as determined by an endothermic depression on a Differential Thermal Analysis (DTA) plot is 315° C.

EXAMPLE 2

In this example 150 parts of water and 81.5 parts of benzophenone tetracarboxylic dianhydride are refluxed in an agitated resin kettle for about ½ hour. The resulting solution is cooled slightly and 27.0 parts of m-phenylene diamine (m-PDA) are added. After about 5 minutes when the m-PDA is dissolved, the solution is transferred to an unagitated autoclave which is in turn put in an air oven. The reaction mass is heated to 150° C. and held there 2⅓ hours at 50 p.s.i.g. The autoclave is then vented to atmospheric pressure over a 15 minute period, heated for another hour at 300° C. and then cooled. A friable, granular solid is obtained which is put into trays and cured an additional 3 hours at 305° C. The resulting product has a volatile content of only 0.8% when heated at 371° C. for 15 minutes. The melting point of this material as determined by DTA is 328° C.

The following Examples 3 to 7 are prepared using pyromellitic acid dianhydride (PMDA). This dianhydride is considered to be the oldest, best known aromatic dianhydride used in polyimide chemistry. These examples are set forth as a control to illustrate the superior molding resins which are obtained when one uses the benzophenone tetracarboxylic reactants in the practice of the present invention and that pyromellitic acid dianhydride does not form polyimide molding powders when prepared according to the present invention. The superior properties obtained in the polyamide resins which are prepared according to the practice of this invention will be discussed in detail below.

EXAMPLE 3

15.21 parts of pyromellitic acid is dissolved under reflux conditions in 100 parts of water in an agitated resin vessel. The solution is cooled to 90° C. and 6.48 parts of m-phenylene diamine is added to the pyromellitic solution. The mixture is refluxed for 14 hours during which time 150 parts of water is added to dilute the slurry as it thickens. The slurry is cooled and the polymeric product is isolated by filtration, washed with water and cured 3 hours at 300° C. The polymeric product is then molded into chips as is described in greater detail below.

EXAMPLE 4

Example 3 is repeated here except that 30.4 parts of pyromellitic acid is dissolved in 500 parts of water at reflux. 12.96 parts of m-phenylene diamine is added to the pyromellitic acid solution which is refluxed for 7 hours. The polymeric material is then filtered, washed with water and cured for four hours at 300° C.

EXAMPLE 5

Example 4 is repeated here except that equimolar quantities of 4,4'-oxydianiline are used in place of the m-phenylene diamine used in Example 4. The polymeric product which is comparable to that obtained in Example 4 is cured for 4 hours at 300° C. and used to make a molded chip as is discussed in further detail below.

EXAMPLE 6

112 parts of pyromellitic acid dianhydride is dissolved in 800 parts of water at 75° C. 88.4 parts of 4,4'-oxydianiline is added and the mixture is heated at reflux for 7½ hours during which time 700 parts of water are added to the reaction mass as the slurry thickens. The slurry is cooled and the polymeric product is isolated, washed and cured for 4 hours at 300° C.

EXAMPLE 7

The general procedures of Example 6 are followed here except that 48.0 parts of pyromellitic dianhydride and 44.1 parts of 4,4'-oxydianiline are dissolved in 750 parts of water refluxed for 7 hours. The reaction mass is then cooled, filtered, washed with water and cured 3 hours at 300° C.

The polymeric products prepared in Examples 1 to 7 above are examined by infrared spectrophotometry and are found to have the characteristic polyimide structure. These granular materials are ball milled into finely divided powders having a particle size of less than 100 mesh. These powders are then molded into chips 2¼" in diameter by 3/16" thick according to the following schedule:

| Pressure (p.s.i.) | Temperature, ° C. | Time, minutes |
| --- | --- | --- |
| 500 | 25 to 400 (750° F.) | 50 |
| 3,000 | 400 | 45 |
| 3,000 | 400 to 150 (300° F.) | 60 | wherein the temperature is increased or decreased uniformly over the indicated ranges during the times stated.

During the molding cycle the mold is vented frequently in order to prevent blistering of the chip upon post-curing. Upon removal from the mold the chips are post-cured for 16 hours. The post-curing is begun at 225° C. and the temperature is raised uniformly to 371° C. over a 14 hour period. The samples are maintained at 371° C. for two hours. The chips are then examined and tested for flexural strength according to ASTM D-790 and for hardness using a Barcol Model GYZJ 934-1 Impressor. The results of these tests are tabulated in Table I below:

TABLE I.—RESULTS OF FLEXURAL STRENGTH AND BARCOL HARDNESS TESTS ON THE POLYMERIC MATERIALS OF EXAMPLES 1 TO 7

| Examples: | Melting point [1] | Flexural strength [2] | Barcol Hardness [3] |
| --- | --- | --- | --- |
| 1 | 315° C. | 23,000 p.s.i. | 57 |
| 2 | 328° C. | 18,000 p.s.i. | 57 |
| 3 | | Sample broke in mold | 0 |
| 4 | | do | |
| 5 | | do | 23-34 |
| 6 | | do | 34 |
| 7 | | do | 0-40 |

[1] No melting point for the polymers prepared from pyromellitic dianhydride was observed on the DTA plot.
[2] In Examples 3 to 7 the samples prepared from pyromellitic dianhydride broke in the mold and flexural strength tests were not able to be run on these samples.
[3] The higher the Barcol Hardness value the harder the material, with a value of zero (0) indicating that the sample did not give a reading on the test instrument. The range of values given for Examples 5 and 7 are the minimum and maximum readings taken on different pieces of the broken chip.

The data in the foregoing table clearly indicates the the superior properties that are obtained in molded objects when the polyimide resins are prepared from benzophenone tetracarboxylic dianhydride rather than pyromellitic anhydride in accordance with the teaching of the present invention. The excellent flexural strength and Barcol hardness values obtained with samples 1 and 2 which were prepared from benzophenone tetracarboxylic dianhydride clearly indicate that these materials have excellent toughness and hardness which make them especially suitable for use as bearings, washers, piston rings, structural components and in other related uses.

Further tests were made with the pyromellitic anhydride based polymeric materials prepared in Examples 3 to 7 in an attempt to find suitable molding conditions for these materials. These materials were molded at temperatures from 476° C. to 565° C. and at pressures in the range of from 10,000 to 20,000 p.s.i. for times up to 30 minutes. In each instance the chips broke in the mold due to poor fusion. In addition the chips molded at the higher temperatures showed signs of degradation at the edges.

The following Examples 8 to 16 are set forth to illustrate other variations that can be made in choice of reactants and reaction conditions within the framework of the present invention. In each example either benzophenone tetracarboxylic anhydride or benzophenone tetracarboxylic acid is used as the tetracarboxylic component.

EXAMPLE 8

75.1 parts of benzophenone tetracarboxylic dianhydride (BTDA) are added to an agitated 1 liter resin kettle containing 400 parts of water. The resulting slurry is heated to reflux (100° C.) and held there ½ hour, during which time the solids all dissolve. The solution is then cooled to about 90° C. and 24.9 parts of meta-phenylene diamine (m-PDA) is added and the resulting solution is again heated at reflux for 12 hours. The solids are filtered, washed with water, and dried 18 hours at 300° C. in an air oven. The resulting product is a granular polyimide resin with a melting point of about 325° C. as determined by DTA. Flexural strength and Barcol hardness tests results on this material are comparable to those obtained in Example 1.

EXAMPLE 9

Example 2 is repeated here except that a solution of 37.4 parts of benzophenone tetracarboxylic dianhydride and 12.6 parts of m-phenylene diamine in 150 parts of water is charged to an autoclave. The reaction mass is heated to 170° C. and held there for 4 hours at 100 p.s.i.g. The autoclave is then vented over 50 minutes and the oven heated to 300° C. and held there 7 hours before cooling. The friable, granular polymeric product has a volatiles content of only 1.0% upon heating at 371° C. for 15 minutes. The melting point of this material as determined by DTA is 331° C. The resulting product is comparable to that obtained in Example 2 in flexural strength and Barcol hardness.

EXAMPLE 10

Example 9 is repeated here except that the reaction mass is held 4 hours at 170° C. and 100 p.s.i.g. and then cooled without venting. The resulting slurry is then filtered and the solids are washed and then dried 3 hours at 300°C. The slurry liquor contains only 0.26% solids by weight which indicates that the polymerization is substantially complete. The volatiles content of the polymeric product is only 1.1% by weight after heating at 371° C. for 15 minutes. The melting point of this material as determined by DTA is 332° C. The resulting product is comparable to that obtained in Example 2 in flexural strength and Barcol hardness.

EXAMPLE 11

Example 1 is repeated here except that the diamine which is used in equimolar quantities is 4,4'-methylene dianiline. Comparable results are obtained.

EXAMPLE 12

Example 1 is repeated here except that the diamine which is used in equimolar quantities is 1,5-diamino naphthalene. Comparable results are obtained.

EXAMPLE 13

Example 1 is repeated here except that the tetracarboxylic component used is benzophenone tetracarboxylic acid rather than the benzophenone tetracarboxylic dianhydride used in Example 1. The resulting polymeric product and molded chips are comparable to those obtained in Example 1.

EXAMPLE 14

The general procedure of Example 1 is followed here except that 140.8 parts of benzophenone tetracarboxylic dianhydride is dissolved in 625 parts of water. After the benzophenone tetracarboxylic dianhydride is dissolved, 47.1 parts of meta-phenylene diamine is added and the reaction mass is then refluxed for 9½ hours. After this time the slurry is cooled to room temperature and the polymeric product is isolated by filtration and washed with water. The slurry liquor is found to contain only 0.23% solids by weight which indicates almost complete conversion of the monomeric reactants. The polymeric product is packed into an aluminum cube and heated at 300° C. for 8 hours. Weight loss on the resulting product is only 0.3% after heating 30 minutes at 120° C. and only 0.9% after heating for 15 minutes at 371.1° C. The melting point of this material as characterized by a DTA plot is 314° C. The resulting product is comparable to that obtained in Example 2 in flexural strength and Barcol hardness.

EXAMPLE 15

Example 2 is repeated here except that the reaction mixture is refluxed for 6½ hours after the addition of the meta-phenylene diamine as compared with the 9½ hour reflux time used in Example 2. A solids content of 0.51% by weight of slurry liquor indicates that polymerization is essentially complete. The polymeric material obtained is cured for 3 hours at 250° C. and 3 hours at 300° C. The resulting post-cured material has a volatile content of only 0.4% by weight when heated at 371° C. for 30 minutes. Molded chips prepared from this material are comparable to those obtained with the molding powder of Example 2.

EXAMPLE 16

The following example is set forth for comparison purposes in order to illustrate that the polymeric products of the present invention, which are prepared by an aqueous process, have superior thermal stability than those materials prepared according to the more conventional organic solvent solution techniques.

In this example equimolar amounts of a benzophenone tetracarboxylic component and meta-phenylene diamine are polymerized in an ethyl alcohol, N-methyl pyrrolidone solvent. The polymerization is carried out at a temperature of 175° and 40 p.s.i.g. for 5 hours. The resulting material is then cured under a nitrogen blanket at 300° C. for 4 hours. The resulting material is then molded into chips as in Examples 1 and 2 above. These chips, along with chips prepared from the polymeric materials of Examples 1 and 2 above, are tested for thermal stability by placing them in a 700° oven. After certain intervals, the samples are tested for thermal stability by measuring the percent weight loss which has occurred during the exposure to high temperatures. The results of these tests are tabulated in the following Table II.

TABLE II.—PERCENT WEIGHT LOSS DATA AFTER AGING AT 700° F.

| Hours at 700° F. | Example 1 | Example 2 | Example 16 |
| --- | --- | --- | --- |
| 150 | 0.8 | 0.8 | 1.4 |
| 200 | 0.9 | 1.1 | 1.8 |
| 300 | 1.3 | 1.3 | 2.6 |
| 450 | 1.9 | 2.3 | 4.6 |
| 500 | 2.0 | 2.5 | 6.2 |
| 540 | 2.3 | | (*) |
| 670 | 2.6 | | |
| 710 | 2.9 | 4.0 | |
| 810 | 3.4 | (*) | |
| 860 | 4.0 | | |
| 1,050 | 6.8 | | |

*Test discontinued.

The data in the foregoing table clearly indicates that the molded chips of Examples 1 and 2, which are prepared from a polyimide resin made by the aqueous process of the present invention exhibit greater thermal stability than the corresponding chips of Example 16 which are prepared from polyimide resin made by the more conventional organic solvent techniques.

The improved thermal stability of the materials prepared in accordance with the teachings of the present invention has great significance in those applications where the molded item is exposed to elevated temperatures for prolonged periods of time.

EXAMPLE 17

This example is set forth to illustrate another variation in the reaction conditions which are used to prepare the polyimide resins of the present invention.

In this example 225 parts of benzophenone tetracarboxylic dianhydride are added to 1000 parts of water at 60° C. in an agitated resin kettle. The slurry is heated to reflux for 30 minutes and then cooled to 90° C. at which time 75 parts of meta-phenylene diamine are added. The mixture is then heated to reflux for 5 minutes to insure complete solution of the reactants. The mixture is then cooled to 65° C. and maintained at this temperature with agitation for 36 hours until the polymerization is substantially complete. The reaction mixture is then cooled to room temperature and the solids are filtered and cured for 4 hours at 300° C. The resulting polymeric product is comparable to that prepared in Example 1 above.

As is evident from Examples 1 and 2 above, the polymerization processes of the present invention may be carried out under atmospheric or superatmospheric conditions. The minimum temperature at which the polymerization is carried out will depend on the solubility of the reactants with 60° C. being the lower limit. This minimum temperature is necessary in order to insure continued solubility of the reactants and formation of the polyimide structure. The maximum temperature at which polyimide formation is carried out in the aqueous polymerization medium will of course be dependent on the pressures used in the polymerization process. In general the upper limit on the pressure and temperature conditions is selected so that they are below the pressure and temperatures at which degradation or deterioration of the polymeric material takes place. In general, the polymerization temperatures will be in the range of from 60° to 400° C. and the pressures will vary from atmospheric to 50,000 p.s.i.

The time required for the completion of the polymerization reaction depends on the temperature and pressure conditions. As is indicated in the foregoing examples, the higher the temperature and pressure, the shorter the time for the polymerization.

The aqueous polymerization process of the present invention may be carried out in closed or open vessels with or without agitation, although some agitation is preferred. The polymerization may be carried out batchwise or in a continuous process. In either method a delayed addition of one or more of the reactants is contemplated.

Conventional aqueous polymerization adjuncts such as surfactants, antifoam agents, buffers and stabilizers, may be used. However, these materials are not necessary to the polymerization reaction and may even introduce undesirable groups onto the polymer which may constitute a potential source of degradation upon prolonged exposure at high temperatures. Therefore, if such aids are used the resulting polymeric products should be thoroughly washed to remove any possible sources of degradation.

As indicated above, the polyimide resins which are prepared in accordance with the teachings of the present invention find widespread use as molding powders.

Surface area measurements were made on the benzophenone tetracarboxylic component based molding powders of the present invention using a Perkin Elmer Sorptometer according to the procedure outlined in Anal. Chem., 30, No. 8, p. 1357 (1958). These measurements indicate that molding powders prepared from a benzophenone tetracarboxylic component in accordance with the teaching of the present invention have an average surface area in the range of from 1 to 500 square meters per gram which makes them especially useful in the fabrication of molded parts such as grinding wheels, bearings, washers, piston rings, structural components and other related objects. These materials are characterized by having excellent thermal stability and resistance to chemical corrosion. In addition, the polyimide resins of the present invention may be used as particulate fillers or with other resins in a wide variety of applications such as reinforcing composites and other structural components.

The polyimide resins which are prepared by the aqueous polymerization process of the present invention may be used in conjunction with fibrous and particulate reinforcing elements. Examples of these would include carbon, graphite, asbestos, glass and boron fibers as well as glass and metal beads or hollow spheres. This invention also includes the concept of using the polyimide resins in conjunction with finely divided metal, glass, ceramic and heat resistant synthetic resin articles. Other additives such as dyes, antioxidants, stabilizers, etc., are also contemplated as being used with the polyimide resins of the present invention.

From the foregoing it will be apparent to those skilled in the art that other variations and uses are possible in the processes and products of the present invention without departing from the spirit and scope thereof.

What is claimed is:

1. An aqueous process for the preparation of a polyimide resin in powder form which is the reaction product of:
   (A) a tetracarboxylic component selected from the group consisting of benzophenone tetracarboxylic dianhydride and benzophenone tetracarboxylic acid; and
   (B) a diamine selected from the group consisting of meta-phenylene diamine, para-phenylene diamine, 4,4'-oxydianiline and 4,4'-methylene dianiline, wherein the process comprises:
      (i) preparing an aqueous solution of the tetracarboxylic and diamine components;
      (ii) heating the solution at a temperature of at least 80° C. until polymerization of the tetracarboxylic and diamine components is substantially complete;
      (iii) recovering the polymer from the aqueous phase; and then
      (iv) heating the polymer at a temperature greater than 60° C. for a time sufficient to complete imidization.

2. The process of claim 1 wherein the polymerization reaction is carried out at a temperature of at least 90° C.

3. The process of claim 1 wherein the polymerization reaction is carried out at reflux temperatures.

4. The process of claim 1 wherein the polymerization reaction is carried out at a temperature in excess of 100° C. and at superatmospheric pressures.

5. The process of claim 1 wherein the polymeric product is cured at 300° C. for at least one hour.

6. The process of claim 1 wherein the diamine is m-phenylene diamine.

7. An aqueous process for the preparation of a polyimide resin in powder form which is the reaction product of:
   (A) a tetracarboxylic component selected from the group consisting of benzophenone tetracarboxylic dianhydride and benzophenone tetracarboxylic acid; and
   (B) meta-phenylene diamine wherein the process comprises:
      (i) preparing an aqueous solution of the tetracarboxylic and meta-phenylene diamine components;
      (ii) heating the solution at a temperature of at least 80° C. until polymerization of the tetracarboxylic and diamine components is substantially complete;
      (iii) recovering the polymer from the aqueous phase; and then
      (iv) heating the polymer at a temperature greater than 60° C. for a time sufficient to complete imidization.

8. The process of claim 7 wherein the polymerization reaction is carried out at a temperature of reflux.

9. The process of claim 7 wherein the tetracarboxylic reactant is benzophenone tetracarboxylic dianhydride.

10. A molding powder which is the reaction product of:
   (A) a tetracarboxylic component selected from the group consisting of benzophenone tetracarboxylic acid dianhydride and benzophenone tetracarboxylic acid; and
   (B) a diamine selected from the group consisting of meta-phenylene diamine, para-phenylene diamine, 4,4'-oxydianiline and 4,4'-methylene dianiline; wherein the molding powder is prepared by a process which comprises:
  (i) preparing an aqueous solution of the tetracarboxylic and diamine components;
  (ii) heating the solution at a temperature of at least 80° C. until polymerization of the tetracarboxylic and diamine components is substantially complete;
  (iii) recovering the polymer from the aqueous phase; and then
  (iv) heating the polymer at a temperature greater than 60° C. for a time sufficient to complete imidization.

11. The molding powder of claim 10 wherein the tetracarboxylic reactant is benzophenone tetracarboxylic dianhydride and the diamine is m-phenylene diamine.

12. The molding powder of claim 10 wherein the tetracarboxylic reactant is benzophenone tetracarboxylic acid and the polyamine is m-phenylene diamine.

13. The molding powder of claim 10 having a surface area of from 1 to 500 square meters/grams.

References Cited
UNITED STATES PATENTS

| | | | |
|---|---|---|---|
| 3,179,631 | 4/1965 | Endrey | 260—78 |
| 3,422,064 | 1/1969 | Gall | 260—47 |
| 3,440,196 | 4/1969 | Boldebuck et al. | 260—29.2 |
| 3,440,197 | 4/1969 | Boldebuck et al. | 260—29.2 |
| 3,441,532 | 4/1969 | Victorius | 260—30.4 |

WILLIAM H. SHORT, Primary Examiner

L. L. LEE, Assistant Examiner

U.S. Cl. X.R.

260—65, 78